Aug. 5, 1958 W. R. CLARK ET AL 2,846,629
FAIL-SAFE ARRANGEMENT
Filed Feb. 27, 1956
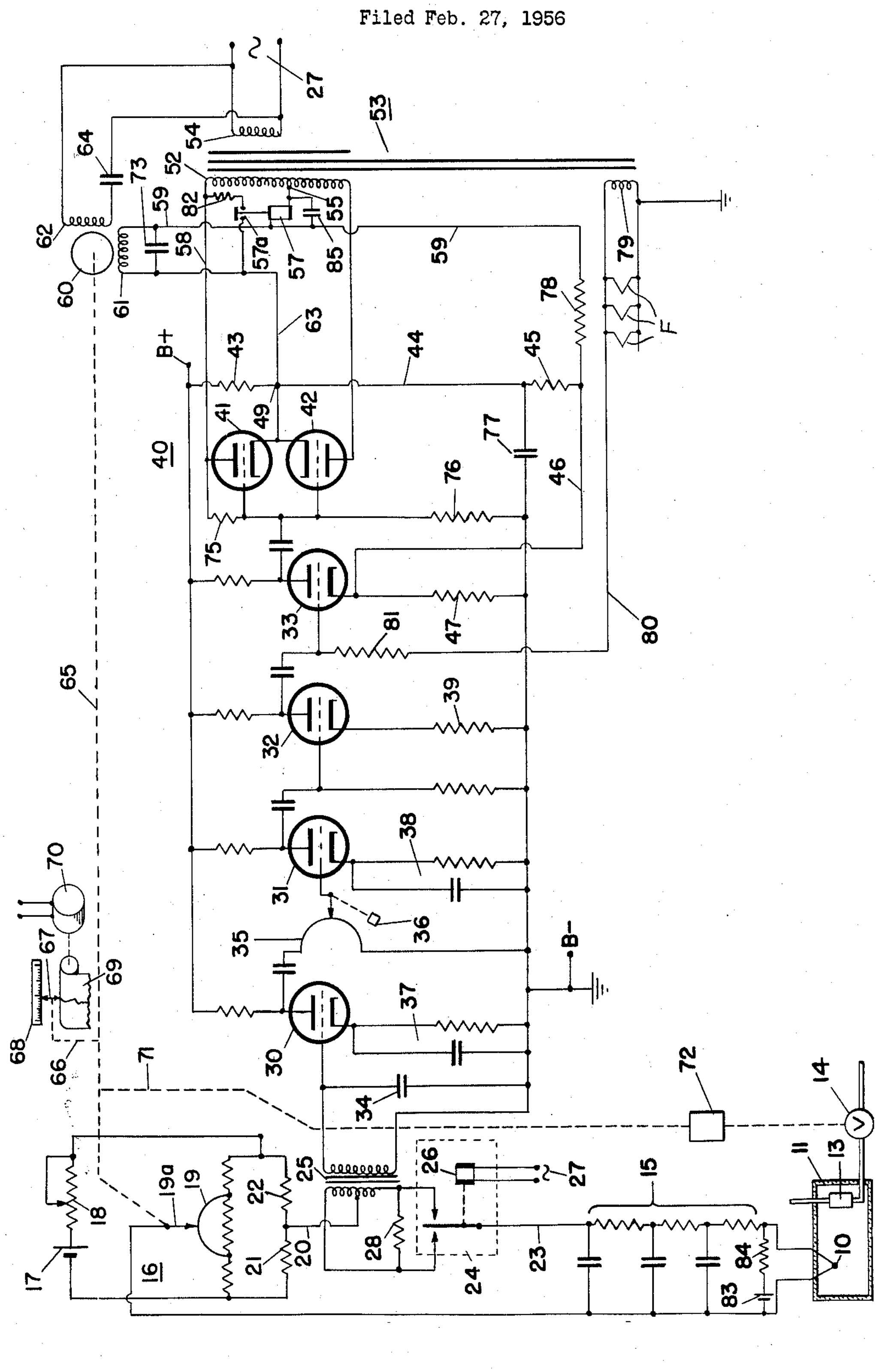

2,846,629
Patented Aug. 5, 1958

2,846,629

FAIL-SAFE ARRANGEMENT

William Russell Clark, Jenkintown, Will McAdam, Blue Bell, and Theodore Cheng, Ardmore, Pa., assignors to Leeds and Northrup Company, Philadelphia, Pa., a corporation of Pennsylvania Application February 27, 1956, Serial No. 568,105

11 Claims. (Cl. 318—28)

This invention relates to systems for measuring and/or controlling the magnitude of a condition; more particularly to arrangements which respond to faults in the measuring circuit, including a condition-responsive element, as well as to faults which may occur in an amplifier and in associated circuitry utilized in the measuring system which is preferably of the null-balance type.

While fail-safe provisions for the measuring circuit are well known to those skilled in the art, and while fail-safe provisions have also been included in and for amplifiers of certain types, there is provided in accordance with the present invention a method of and apparatus for applying to the amplifier fail-safe biasing means which is at all times effective to assure operation of a final control element to a position considered safe from the standpoint of the process under the control, and preferably without introduction of offset in the output from or in the position of a potential-controlling element of the measuring system.

In accordance with further features of the present invention, there are utilized in conjunction with the zero-offset type of fail-safe protection other and additional fail-safe provisions which cooperate together to assure fail-safe operation of the indicating and controlling system in the event of failure of any part of the circuit as from the condition-responsive element itself to the driving means for the final control element.

In carrying out the invention in one form thereof, an amplifier is provided with a power output stage for controlling the energization of a system-balancing means which may include a motor for rotation in one direction or the other to adjust the position of a final control element to maintain the magnitude of a condition at a predetermined value. The amplifier preferably includes one or more stages of voltage amplification. A fail-safe biasing voltage is applied to the power output stage, and from its output there is introduced into an earlier stage of the amplifier negative feedback which is effective to reduce to an insignificant amount the effective magnitude of the fail-safe voltage during normal operation of the system. Upon failure of any voltage-amplification stage included in the negative feedback loop, the fail-safe voltage immediately becomes effective to operate the final control element in the "safe" direction.

In accordance with a further aspect of the invention, the advantages of the negative feedback circuit, combined with the foregoing fail-safe provisions, are utilized to stabilize the gain of the amplifier, and particularly in respect to variations thereof which occur upon change of line-voltage. By means of additional fail-safe voltages introduced into the amplifier ahead of the stages to which the negative feedback is applied, protection is provided for all parts of the amplifier and associated measuring circuits ahead of the power stage.

For further objects and advantages of the invention, reference is to be had to the following detailed description taken in conjunction with the accompanying drawing, in which there has been schematically illustrated a system embodying the present invention.

While the invention is applicable to servo-systems generally of the null-balance type and which include an amplifier having a power stage for controlling the operation of a system-balancing means shown as a motor or transducer which positions the final control element, it has been illustrated as applied to a measuring system of the type disclosed in Williams Patent No. 2,657,349. A condition-responsive device such as a thermocouple 10 responds to the condition under control, as for example, the temperature within a compartment 11 having associated therewith a heat exchanger 13 through which flows a heat-transferring medium. For convenience, it will be assumed that this medium is a heating fluid regulated by a final control element comprising a valve 14.

The output of the thermocouple 10 is applied to a filter 15 included in a measuring circuit. The voltage developed by the thermocouple 10 is opposed by a voltage derived from a potentiometer 16 powered from a battery 17 having in series therewith a rheostat 18. The voltage which opposes that of the thermocouple 10 is derived from the potentiometer by way of the adjustable contact 19*a* of a slidewire 19 and by the conductor 20 connected at the juncture between resistors 21 and 22. The resistors associated with the slidewire 19, and including resistors 21 and 22, are provided for purposes of calibration and cold-junction compensation, as is well understood by those skilled in the art. Upon change in the magnitude of the condition under measurement, a difference voltage appears between conductors 20 and 23 which by means of a vibrator 24 and a transformer 25 is converted to alternating current. The vibrator 24 has its operating coil 26 energized from a suitable alternating current source of supply 27 and is preferably of the synchronous type. A resistor 28 preferably shunts the two stationary contacts of the vibrator 24 to decrease the input impedance for improved system performance. This resistor is desirable when the vibrator 24 is of the normally-open contact type.

The secondary winding of transformer 25 applies the alternating current voltage or error signal to the input circuit of the first stage of amplification shown as including a triode 30. It is followed by additional voltage amplification stages 31, 32, 33, also illustrated as triodes, though it is to be understood that other types of amplifying means may be utilized. The voltage-amplification stages 30—33 are to large degree conventional and include associated circuit components having values selected for best operation for the tube types used. A capacitor 34 is connected across the secondary winding of transformer 25 to shunt from the input circuit high-frequency transients. A gain-controlling potentiometer 35 may be included in one stage, for example, in the input circuit of the stage 31 and can be adjusted by a knob 36 as may be desired. While the stages 30 and 31 include conventional cathode-biasing means 37 and 38, each including a resistor and a capacitor, the stage 32 has an unbypassed cathode resistor 39 for introduction of some negative feedback.

The B-supply for the amplifier is utilized for application of a fixed negative bias to the stage 33 as well as to the power output stage 40 which includes a pair of tubes 41 and 42, also shown as triodes. The biasing circuit may be traced from B+ by way of a resistor 43, conductor 44, resistor 45, conductor 46, and by way of the cathode-resistor 47 to the other side, B—, of the B-supply. The direct current flowing through resistor 47 makes the cathode of the triode of stage 33 positive with respect to its grid. Since the cathodes of the triodes 41 and 42 are connected at 49 to conductor 44, it will be seen that they are more positive relative to their grids than the cathode of the stage 33 with respect to its grid, particularly due to the drop in voltage across the resistor 45. The resistors 43, 45 and 47 may also be considered as forming voltage-dividers for establishing the desired negative biases on the stages 33 and 40. The functions of said resistors as voltage-dividers with respect to addition features of the invention will be later set forth.

It is to be observed that the grids of tubes or triodes 41 and 42 are connected together and receive the same input signal from the coupling capacitor from the amplifier stage 33. With the tubes 41 and 42 equally conductive the motor 60 will be at stand still. Since the anodes of tubes 41 and 42 are connected to the respective ends of the secondary winding 52 of transformer 53 with the cathodes connected to the mid-tap thereof, each tube will conduct when the alternating current is of a polarity making its anode positive with respect to its cathode. Since each tube conducts on every alternate half cycle, the output current flowing through the control winding 61 will have one component with a frequency of 120 cycles per second and another component unidirectional in character. Because of the equality in the conduction of tubes 41 and 42, there is not present in the output circuit including motor control winding 61 a component of current having a frequency of 60 cycles per second. Since the power winding 62 of the motor 60 is energized with 60-cycle alternating current from source 27, no torque will be developed by the motor 60 as long as the tubes 41 and 42 conduct equally. If a 60-cycle alternating current signal be applied to the grids of tubes 41 and 42, the equality of conduction of the two tubes disappears. When such an input signal makes a grid of one of the tubes less negative or more positive with respect to its cathode at the time its anode or plate is positive, that tube will have increased conduction while such signal makes the other grid more negative when its plate is positive resulting in decreased conduction for this tube. Accordingly, there will appear at the control winding 61 a 60-cycle component which will produce rotation of the motor. A 60-cycle alternating current input signal applied to the grids of tubes 41 and 42 will be in phase with either the alternating current plate supply of tube 41 or of the plate supply of tube 42. Such an alternating current input signal is applied to the grids of tubes 41 and 42 when there is a potential difference between conductors 20 and 23 of the measuring circuit. That input signal will be in phase with the anode supply of one of the tubes 41 and 42, depending upon the direction of unbalance of the signal appearing between the conductors 20 and 23. The potential difference, of unidirectional character appearing between conductors 20 and 23 upon a change of temperature of thermocouple 10, is applied by way of vibrator 24 to the primary winding of transformer 25. By reason of the operation of the vibrator 24 and by the action of the transformer 25, that potential difference is converted to a 60-cycle alternating current input signal.

The alternating current signal developed by the transformer 25, as above described, is amplified by stages 30—33 and applied to the input circuit of the power stage 40. It will be seen that when the amplified 60-cycle alternating current input signal is of one phase or the other, 60-cycle alternating current of one phase or the other will predominate in the output circuit depending upon the relative conductivity of tubes 41 and 42. The motor 60 will be rotated in a direction to move the slidewire contact 19*a* in a direction to rebalance the network, i. e., to decrease the potential difference or unbalance signal appearing between conductors 20 and 23. The output circuit of the power stage 40 may be traced from the center-tap 55 of transformer 53 by way of a relay coil 57, conductor 59, a motor-control winding 61 and by conductor 63 to the cathodes of the tubes 41 and 42. The circuit is completed by way of the tubes 41 and 42 to the respective ends of the secondary winding 52.

Besides the control winding 61 shunted by a tuning capacitor 73, the motor 60 of the alternating current type has a power winding 62 connected by way of a phasing capacitor 64 to the alternating current source of supply 27. The motor 60 is energized for rotation in a direction to adjust contact 19*a* of slidewire 1 in a direction to reduce the error signal between conductors 20 and 23, a driving connection 65 being illustrated from motor 60 to contact 19*a*. The motor 60 also adjusts through a driving connection 66 a pen-index 67 associated respectively with a scale 68 and a recording chart 69 driven by constant-speed or synchronous motor 70. Thus, the system so far described continuously indicates or records the magnitude of the condition to which the thermocouple 10 responds.

Through a mechanical connection 71, the final control element of valve 14 is adjusted in a direction to compensate for the change in condition under control. While the final control element may be operated directly from the motor 60, it will in general be preferred to utilize additional control features as indicated by the symbol 72. The additional control features may be of the type described and claimed in Davis Patents 2,300,537 or 2,666,170.

In accordance with the invention, a fail-safe voltage or bias is applied to the last or power stage of the amplifier by means of a resistor 75 which connects the grids of triodes 41 and 42 to one end of the secondary winding 52 of the transformer 53. More particularly, the fail-safe circuit extends by way of conductor 58 from the upper end of secondary winding 52 to the fail-safe resistor 75; thence by way of grid resistor 76, a blocking capacitor 77 and by way of conductors 44, 63, motor winding 61, conductor 59, and relay winding 57 to the center-tap 55 of secondary winding 52. The fail-safe voltage thus applied to the triodes 41 and 42 has a phase relation which makes the triode 41 more conductive relative to triode 42 for 60-cycle energization of the motor 60 in a direction to drive the pen-index 67 up-scale and through the mechanical connection 71 to move the valve 14 toward the closed position. Since the fail-safe voltage applied to the grids by way of resistor 75 makes both grids positive relative to cathode at the same time the plate of tube 41 is positive relative to cathode, the foregoing increase in conduction of the tube 41 is produced for rotation of the motor in the fail-safe direction. At the time the foregoing occurs, the plate of tube 42 is negative with respect to cathode and, therefore, the fail-safe voltage is not effective upon that tube to increase conductivity. For the following half cycle, when the tube 42 is conductive the fail-safe voltage applied by way of resistor 75 makes both grids more negative with respect to cathode and thus decreases the current conduction of tube 42. The action just described is the same as that which occurs when a 60-cycle input signal is applied to the tubes 41 and 42 from the transformer 25 for rotation of the motor 60 in a fail-safe direction. The alternate increase in conduction of tube 41 and decrease in conduction of tube 42 in either case produces the 60-cycle component of alternating current in control winding 61 for rotation of the motor 60.

If the fail-safe direction of the final control element 14 be the reverse of that just described, the resistor 75 will be connected between the grid and plate of triode 42 for energization from the lower half of the secondary winding 52 for moving the final control element in the "safe" direction with down-scale movement of the pen-index 67.

Further in accordance with the invention, the amplifier as a whole is made relatively independent of changes in line-voltage, as from the alternating current supply 27, which is also used in conjunction with a rectifying system of conventional design for the B-supply. Variations in the operation of the amplifier, due to variations in line-voltage, to large extent affect the power stage 40. By providing a negative feedback circuit for the driver stage 33, the effect upon the amplifier of line-voltage variations is to large degree eliminated. The feedback voltage is derived from the motor control winding 61 in the output of the power stage 40 as by conductors 44 and 59 which apply the feedback voltage to a voltage-divider including the resistor 45 and a resistor 78. The fraction of that voltage developed across the resistor 45 is applied to the cathode resistor 47 of the stage including tube 33 by the conductor 46 and the capacitor 77. That capacitor has a value which offers low impedance to the alternating current feedback voltage.

In addition to eliminating changes in gain due to line-voltage variations, the provision of the negative or degenerative feedback reduces the output impedance of the amplifier and increases the dynamic braking of the motor 60. This comes about as follows. Since the power winding 62 of the motor 60 is continuously energized from the power source 27, the rotor of the motor when rotating in that field generates in the motor control winding 61 a 60-cycle alternating current voltage of amplitude proportional to the speed of rotation. The control winding 61 is connected in a conductive circuit for flow of current, the magnitude of which will depend upon the impedance of its circuit. This circuit includes the output impedance of stage 40. Since the negative feedback reduces that output impedance, there is greater current flow and, accordingly, the increased dynamic braking of the motor as above described. In addition, the negative feedback voltage modifies the output of the driver stage 33 substantially entirely to compensate at the grids of of the power stage 40 for the fail-safe bias-voltage introduced by the resistor 75 and the circuit associated therewith. Thus, while the fail-safe voltage at resistor 75 is immediately effective upon failure of the stage 33, nevertheless, during normal operation, the fail-safe voltage developed at resistor 75 does not introduce or require any offset in the voltage derived from slidewire 19, as by change in the position of the contact 19*a* relative to slidewire 19. This comes about as follows. The fail-safe voltage introduced by the resistor 75 tends alternately to increase the conduction of tube 41 and to decrease the conduction of tube 42. The foregoing effects are amplified in terms of the output voltage appearing across motor control winding 61. This amplified voltage is applied by way of conductors 44 and 59 to the voltage divider 45, 78, and thence by way of conductor 46 to the cathode side of cathode resistor 47. This feedback voltage, since derived from the output circuit of stage 40, is 180 degrees out of phase with the fail-safe voltage applied by way of resistor 75 to the grids of tubes 41 and 42. Thus as applied to the input circuit of the stage or tube 33, the feedback voltage has an instantaneous polarity which at the output of tube 33 is in opposition to the fail-safe voltage. Thus the effect of the voltage fed back to the stage 33 is to oppose at the grids of tubes 41 and 42 the fail-safe voltage applied by way of the resistor 75. The difference voltage, if any, on the grids of tubes 41 and 42 is insufficient to produce rotation of the motor 60 and, accordingly, there is not introduced offset in the voltage derived from the slidewire 19 due to the fail-safe voltage introduced by resistor 75.

For low cost amplifiers, the arrangement just described is to be preferred for the reason that the introduction of negative feedback does reduce gain. If negative feedback be provided, as for example at the initial stage 30, additional stages of amplification may be needed to compensate for the loss in gain due to negative feedback extending around the entire amplifier. Accordingly, while it is to be understood that negative feedback may be applied at the first stage 30 or to any of the intermediate stages, nevertheless the maximum advantages for minimum cost are attained by providing the negative feedback circuit from the output of the power stage 40 to the driver stage 33.

It has been found that with the arrangement as illustrated in the drawing, the magnitude of the fail-safe voltage developed at the resistor 75 may not be increased to a point where it will afford protection for the circuit elements ahead of the driver stage 33 without overloading the driver stage 33; i. e., causing saturation thereof during normal operation. Accordingly the feedback voltage developed at the resistor 75 is of a relatively low order of magnitude, in one embodiment of the invention of the order of three volts. It is compensated for by the negative feedback voltage to within a fraction of a volt, and more particularly, in one embodiment of the invention to within about two hundred millivolts.

Instead of increasing the magnitude of the fail-safe voltage introduced at the resistor 75 to protect against failure of the circuitry ahead of the driver stage 33, there is employed in accordance with the present invention a fail-safe bias or voltage derived from a winding 79 of the transformer 53 which may conveniently be the filament winding of the transformer utilized for the supply of the filaments F of the amplifier. Several of these are illustrated in association with the winding 79. Thus, the fail-safe voltage derived from winding 79 is applied by way of conductor 80 and a grid resistor 81 to the grid of the driver stage 33. Only a relatively small voltage is introduced by winding 79 and it is compensated for during normal operation by a slight offset in the position of contact 19*a* relative to slidewire 19 from its position of balance for the voltage from thermocouple 10. Upon failure of any circuitry of the amplifier ahead of the driver stage 33, the compensating voltage applied by way of the transformer 25 disappears and thus the fail-safe voltage introduced from winding 79 is effective to energize the motor 60 to rotate in the fail-safe direction.

It will be recalled that in tracing the output circuit of the power amplifier 40 there was included in it the operating coil 57 of a relay illustrated in the open position. This relay and the circuit completed by its contacts 57*a* represents a further fail-safe provision to protect against failure of the power stage 40. Normally, both tubes 41 and 42 of the power stage 40 are equally coductive, and, accordingly, two components of current flow through the motor winding 61. One component has a frequency of 120 cycles per second. The other component is of unidirectional character and is effective to maintain the relay contacts 57*a* in their open position. A capacitor 85 is connected in shunt with the relay coil 57 for the purpose of minimizing chattering of the contacts 57*a* and reducing the 60-cycle impedance of the combination. The component of alternating current at 120 cycles per second is ineffective to produce rotation of the motor 60. However, upon failure of either of tubes 41 and 42 with resultant unequal conduction of the tubes there is developed at the motor winding 61 an alternating current component having a frequency predominantly of 60 cycles per second. Such a current does produce energization of motor 60. More particularly, if tube 42 fails, the alternating current component at 60 cycles per second is developed by way of tube 41 for the motor winding 61 and thus the motor 60 is energized for rotation in a fail-safe direction; i. e., up-scale. As the motor moves contact 19*a* up-scale, the signal applied by way of the transformer 25 and developed at the grid of tube 41 has a phase relation with respect to the anode supply voltage which reduces the output from the tube. That reduction in output, both of the A. C. and D. C. componuets, causes deenergization of relay coil 57 for closure of the circuit through the contacts 57*a*. Upon closure of said contacts, the motor winding 61 is connected through a resistor 82 directly across the upper half of the secondary winding 52 of transformer 53. Thus, the motor is energized for continued rotation in the fail-safe direction. That energization is maintained so that the pen-index 67 reaches an upper limit of movement, at which time the valve or final control element 14 will have been moved to a minimum-open position.

If the tube 41 should fail, a component of 60-cycle alternating current is developed by way of tube 42 for controlling winding 61 and the motor 60 is energized for rotation in the "unsafe" direction. The resultant adjustment of contact 19*a* of slidewire 19 will be in a direction for the application of an input signal by way of transformer 25 and the voltage-amplification stages to apply to the input circuit of tube 42 a signal which reduces the current flow through that tube. Accordingly, with the resultant decrease in the unidirectional component thereof, the relay coil 57 will be substantially deenergized for closure of the contacts 57*a*. The motor will then be energized for operation in a fail-safe direction. As soon as it operates a short distance, the resulting adjustment of slidewire contact 19*a* changes the signal applied to the input of tube 42 to increase the components of current flow through it for energization of coil 57 and for reversal in the direction of rotation of the motor 60. The foregoing operations will cyclically repeat themselves with the motor being energized first for rotation in one direction and then in the other. The resultant oscillatory movement of the pen-index 67 provides ample indication to an operator of the failure of the tube 41.

The oscillation which does take place upon failure of tube 41 will be within a fairly narrow range. The valve 14 will be positioned in substantial accordance with the magnitude of the condition under control.

Ordinarily the output stage 40 will be a twin triode within a single envelope and having a common cathode heater. Obviously, upon failure of the cathode heater, tubes 41 and 42 will be non-conductive and relay 57 will be immediately deenergized to close contacts 57*a* for rotation of the motor 60 in the fail-safe direction and to a fail-safe limiting position.

As already explained, many variations and modifications of the invention may be made within the scope of the appended claims and amplifiers of types differing from the one illustrated may be utilized. Accordingly, by way of amplification of disclosure of the amplifier illustrated and not by way of limitation, the following may be taken as typical values for a number of circuit components used in an embodiment of the invention where twin triodes of the 12AX7 type were used for tubes 30 and 31; and for tubes 32 and 33; and a twin triode of the 12BH7 type was used for the tubes 41 and 42.

| Circuit Components | Resistance in ohms or capacity in microfarads |
|---|---|
| resistor 78 | 22,000. |
| resistor 45 | 10,000. |
| resistor 43 | 270,000. |
| resistor 82 | 22,000. |
| resistor 47 | 1,500. |
| resistor 81 | 2.2 megohms. |
| resistor 84 | 10 megohms. |
| resistor 75 | 6.8 megohms. |
| coil 57 | preferably not above 350. |
| capacitor 85 | 50. |
| capacitor 77 | 25. |
| capacitor 73 | 1. |
| capacitor 64 | 2.3. |

In addition to the fail-safe provisions primarily for the amplifier itself, it will in general be desirable to include a fail-safe circuit for the measuring circuit including the condition-responsive element 10. Such a fail-safe circuit may comprise a source of supply such as a dry cell 83 and a high-valued resistor 84 connected in shunt across the circuit of the thermocouple 10. The resistor 84 is preferably of such a high value that substantially all of the voltage of the dry cell 83 appears as a potential drop across it and with negligible introduction of voltage into the measuring circuit including conductors 20 and 23. However, upon opening of the thermocouple circuit, the low resistance shunt formed by that circuit is removed and a substantial fraction of the voltage of the dry cell 83 is then applied to the measuring circuit for the development of an input signal having a polarity which energizes the motor 60 for rotation in a fail-safe direction.

What is claimed is:

1. In a null-balance system of the type unbalanced by change in the magnitude of a condition, and having balancing means for rebalancing the system, the combination of an A. C. amplifier having a power output stage for controlling the energization of said balancing means to rebalance said system and including additional stages of amplification, a negative feedback circuit extending from the output of said power stage to the input of an intermediate stage of amplification, and fail-safe biasing means applying to said amplifier fail-safe voltages both within and without said feedback loop for modifying in a selected direction energization of said balancing means in the event of failure of amplifier components ahead of said feedback loop and within said loop.

2. A null-balance system of the type unbalanced in one direction or the other by change in one direction or the other in the magnitude of a condition, balancing means operable in accordance with the direction and extent of said unbalance to rebalance the system, an amplifier responsive to said unbalance for controlling the operation of said balancing means to rebalance the system, said amplifier including a first stage of amplification, at least one intermediate stage of amplification and a final stage of amplification, a feedbock loop between said last stage of amplification and an intermediate stage, and means for applying to an input of said final stage of amplification a bias to energize said balancing means in a selected direction in event of failure of any intermediate stage in said loop, said feedback loop being operative during normal operation effectively to balance out said bias.

3. A null-balance system of the type unbalanced by change in the magnitude of a condition and including balancing means for rebalancing said system, an amplifier responsive to unbalance of the system for controlling the operation of said balancing means to rebalance the system, said amplifier including at least three stages of amplification, means for applying a bias signal to an intermediate one of said stages to cause said balancing means to be energized in a fail-safe direction upon failure of a preceding stage, a degenerative feedback loop connected between the output of a last one of said amplifying stages and said intermediate amplifying stage, a second means for applying a bias to the input of said last stage for energizing said balancing means in said fail-safe direction in event of failure of said intermediate stage and succeeding stages, and a relay responsive to a failure of said last stage for energizing said balancing means in said fail-safe direction.

4. A null-balance system as in claim 3 in which said intermediate stage includes an electronic tube having a cathode circuit including a resistor and in which a fraction of the output signal from said last stage is applied to said cathode resistor by said feedback circuit.

5. A null-balance system as in claim 3 in which said last stage includes at least one electronic tube having a plate circuit and a grid circuit and in which said means for applying said bias includes a conductive path between said plate circuit and said grid circuit.

6. In a null-balance system of the type unbalanced by change in the magnitude of a condition, and having means including a reversible motor for rebalancing the system, the combination of an amplifier having a power output stage for controlling the energization of said motor for rotation in one direction or the other and including at least one stage of voltage amplification responsive to unbalance of the system, fail-safe biasing means for applying to said power output stage a fail-safe voltage for energization of said motor in a selected direction in the event of failure of amplifier components ahead of said power output stage, and means for applying to an input of said amplifier a voltage independent of said rebalancing means for producing at said power output stage a voltage compensatory of said fail-safe voltage to reduce to an insignificant amount the effective magnitude of the fail-safe voltage during normal operation of the system.

7. The system of claim 6 in which said means for applying said voltage to said amplifier input is a degenerative feedback circuit connected from the output of said amplifier to said input.

8. The system of claim 7 in which said degenerative feedback circuit includes a voltage-divider formed by a pair of resistors, means forming with one of said resistors a second voltage-divider, and means for supplying by way of said second voltage-divider a fixed negative bias to said stage of voltage amplification.

9. The system of claim 8 in which said second voltage-divider includes a connection therefrom to said power output stage for applying a fixed negative bias to the input circuit thereof.

10. A null-balance system as in claim 6 in which said power output stage comprises a pair of electronic tubes each including a plate, a grid and a cathode, a center-tapped transformer having its outer ends connected respectively to said plates, said motor having a control winding serially connected between said cathodes and the center tap of said transformer, said tubes being alternately selectively conductive to produce output signals of opposite phase, said motor being responsive to one of said output signals for rotation in one direction and responsive to another of said output signals of opposite phase for rotation in an opposite direction, said tubes being responsive to the phase of the signal applied to the grids thereof from said voltage-amplification stage to vary the ratio of magnitude between the output signals of said tubes for causing said motor to rotate in one direction or in the opposite direction, said biasing means comprising a conductive connection between the plate of one of said tubes and the grid thereof, and said feedback loop being connected between the transformer side of said control winding and the cathode of said voltage-amplification stage.

11. In a null-balance measuring system of the type unbalanced by change in the magnitude of a condition and having balancing means for producing a rebalancing effect and having an indicator operated therewith for indicating the magnitude of said condition, the combination of an A. C. amplifier having a power output stage connected to said balancing means for controlling the magnitude of said rebalancing effect and including additional stages of amplification, a negative feedback circuit extending from the output of said power stage to the input of one of said additional stages of amplification, and fail-safe biasing means applying to said amplifier fail-safe voltages both within and without said feedback loop for energization of said output stage for operation of said balancing means in the event of failure of any of said additional stages of said amplifier whether within or without said feedback loop to produce a fail-safe indication by said indicator.

References Cited in the file of this patent

UNITED STATES PATENTS

| | | |
|---|---|---|
| 2,628,333 | Malby | Feb. 10, 1953 |
| 2,684,459 | Brown | July 20, 1954 |